(12) United States Patent
Yuki et al.

(10) Patent No.: US 11,498,863 B2
(45) Date of Patent: Nov. 15, 2022

(54) COVER GLASS

(71) Applicant: Nippon Electric Glass Co., Ltd., Shiga (JP)

(72) Inventors: Ken Yuki, Shiga (JP); Tomonori Ichimaru, Shiga (JP); Yohei Hosoda, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 16/955,854

(22) PCT Filed: Dec. 21, 2018

(86) PCT No.: PCT/JP2018/047299
§ 371 (c)(1),
(2) Date: Jun. 19, 2020

(87) PCT Pub. No.: WO2019/131528
PCT Pub. Date: Jul. 4, 2019

(65) Prior Publication Data
US 2020/0317558 A1     Oct. 8, 2020

(30) Foreign Application Priority Data

Dec. 26, 2017   (JP) .............................. JP2017-248966

(51) Int. Cl.
*C03C 3/068* (2006.01)
*C03C 3/066* (2006.01)
(Continued)

(52) U.S. Cl.
CPC .............. *C03C 3/068* (2013.01); *C03C 3/066* (2013.01); *C03C 3/087* (2013.01); *C03C 3/093* (2013.01);
(Continued)

(58) Field of Classification Search
CPC ......... C03C 3/068; C03C 3/066; C03C 3/087; C03C 3/093; C03C 3/095; C03C 3/097
See application file for complete search history.

(56) References Cited

U.S. PATENT DOCUMENTS 10,857,259 B2 * 12/2020 Deng .................... C03C 4/0021
2006/0063009 A1   3/2006 Naitou et al.
(Continued)

FOREIGN PATENT DOCUMENTS

JP    2006-83045     3/2006
JP    2012-148909    8/2012
(Continued)

OTHER PUBLICATIONS

WO2015162845 machine translation (Year: 2015).*
(Continued)

*Primary Examiner* — Karl E Group
*Assistant Examiner* — Cameron K Miller
(74) *Attorney, Agent, or Firm* — Wenderoth, Lind & Ponack, L.L.P.

(57) ABSTRACT

A cover glass of the present invention is characterized by including in a glass composition at least three or more components selected from $SiO_2$, $Al_2O_3$, $B_2O_3$, $Li_2O$, $Na_2O$, $K_2O$, $MgO$, $CaO$, $BaO$, $TiO_2$, $Y_2O_3$, $ZrO_2$, and $P_2O_3$, and having an X value of 7,400 or more calculated by the following equation. The X value is a value calculated by the equation $X=61.1\times[SiO_2]+174.3\times[Al_2O_3]+11.3\times[B_2O_3]+124.7\times[Li_2O]-5.2\times[Na_2O]+226.7\times[K_2O]+139.4\times[MgO]+117.5\times[CaO]+89.6\times[BaO]+191.8\times[TiO_2]+226.7\times[Y_2O_3]+157.9\times[ZrO_2]-42.2\times[P_2O_5]$.

17 Claims, 1 Drawing Sheet

(51) Int. Cl.
*C03C 3/087* (2006.01)
*C03C 3/097* (2006.01)
*C03C 3/095* (2006.01)
*C03C 3/093* (2006.01)
*C03C 21/00* (2006.01)

(52) U.S. Cl.
CPC .............. *C03C 3/095* (2013.01); *C03C 3/097* (2013.01); *C03C 21/001* (2013.01)

(56) References Cited

U.S. PATENT DOCUMENTS

| | | | | |
|---|---|---|---|---|
| 2010/0035745 | A1* | 2/2010 | Murata | C03C 3/085 501/68 |
| 2013/0034670 | A1* | 2/2013 | Hashimoto | C03C 3/095 428/1.32 |
| 2013/0288001 | A1* | 10/2013 | Murata | C03C 3/085 428/141 |
| 2014/0309097 | A1 | 10/2014 | Hochrein et al. | |
| 2014/0335335 | A1 | 11/2014 | Koch, III et al. | |
| 2015/0072130 | A1 | 3/2015 | Tokunaga et al. | |
| 2015/0246846 | A1* | 9/2015 | Choju | B65D 1/40 428/34.4 |
| 2015/0376050 | A1 | 12/2015 | Nakamura et al. | |
| 2015/0376057 | A1 | 12/2015 | Koch, III et al. | |
| 2016/0114564 | A1 | 4/2016 | Dejneka et al. | |
| 2019/0160201 | A1 | 5/2019 | Deng et al. | |

FOREIGN PATENT DOCUMENTS

| | | |
|---|---|---|
| JP | 2015-78092 | 4/2015 |
| JP | 2016-523801 | 8/2016 |
| JP | 2016-524581 | 8/2016 |
| WO | 2013/180220 | 12/2013 |
| WO | WO-2015162845 A1 * 10/2015 ............. C03C 3/091 |
| WO | 2019/108571 | 6/2019 |

OTHER PUBLICATIONS

International Search Report dated Mar. 26, 2019 in International (PCT) Application No. PCT/JP2018/047299.
Tetsuro Izumitani et al., "New glass and physical properties thereof," First edition, Management System Laboratory Co., Ltd., Aug. 20, 1984, pp. 451-498 (Cited in Specification and partial English translation).
International Preliminary Report on Patentability and Written Opinion of the International Searching Authority dated Jun. 30, 2020 in International (PCT) Application No. PCT/JP2018/047299.

* cited by examiner

COVER GLASS

TECHNICAL FIELD

The present invention relates to a cover glass, and more particularly, to a cover glass suitable for a touch panel display of, for example, a cellular phone, a digital camera, or a personal digital assistant (PDA).

BACKGROUND ART

A cellular phone, a digital camera, a personal digital assistant (PDA), or the like shows a tendency of further prevalence. In those applications, a tempered glass obtained through ion exchange treatment is used as a cover glass for a touch panel display (see Patent Literature 1 and Non Patent Literature 1).

CITATION LIST

Patent Literature

Patent Literature 1: JP 2006-83045 A
Patent Literature 2: JP 2016-524581 A

Non Patent Literature

Non Patent Literature 1: Tetsuro Izumitani et al., "New glass and physical properties thereof," First edition, Management System Laboratory. Co., Ltd., Aug. 20, 1984, p. 451-498

SUMMARY OF INVENTION

Technical Problem

The cover glass, particularly a cover glass used for a smart phone is often used outdoors, and is hence liable to suffer from a hard scratch, that is, a scratch having a large width and a large depth. As a result, the cover glass is liable to be broken from the scratch as an origin. Therefore, it is important to improve the scratch resistance of the cover glass.

As a method of improving the scratch resistance, a method involving increasing the hardness of the cover glass has been investigated. Specifically, related-art glass has a much lower hardness than silica (sand), which exists in large amounts on earth, and hence has a property of being liable to suffer from a surface scratch owing to silica. Therefore, it is considered that, when the hardness of the cover glass is increased, the cover glass is less liable to suffer from the surface scratch. However, when the hardness of the cover glass is to be increased, the viscosity at high temperature of glass is increased, resulting in a significant reduction in meltability or formability. Further, a glass composition loses its balance, with the result that devitrified stones are liable to be generated during forming. As a result, it becomes difficult to collect good-quality products.

In addition, it is known that, when a hard thin film is formed on a glass surface, the hardness of the cover glass is increased (for example, see Patent Literature 2). However, when the hard thin film is formed on the glass surface, there is a risk in that the transparency of the cover glass is reduced or warpage of the cover glass occurs owing to film stress.

In this connection, sapphire, which has a high hardness, seems to be suitable for a cover member. However, it is difficult to produce a sheet-shaped body having large dimensions in a large amount with sapphire.

The present invention has been made in view of the above-mentioned circumstances, and a technical object of the present invention is to devise a cover glass having high scratch resistance.

Solution to Problem

The inventors of the present invention have made various investigations, and as a result, have found that an X value calculated by the following equation 1 is closely related to the size of a scratch, and also found that, when the X value is restricted to a predetermined value or more, the above-mentioned technical object can be achieved. Thus, the finding is proposed as the present invention. That is, according to one embodiment of the present invention, there is provided a cover glass, which comprises in a glass composition at least three or more components selected from $SiO_2$, $Al_2O_3$, $B_2O_3$, $Li_2O$, $Na_2O$, $K_2O$, MgO, CaO, BaO, $TiO_2$, $Y_2O_3$, $ZrO_2$, and $P_2O_3$, and which has an X value of 7,400 or more calculated by the following equation 1. With this, the cover glass is less liable to suffer from a surface scratch. Even when the cover glass suffers from a hard scratch, the width and depth of the scratch can be reduced. In the following equation 1, $[SiO_2]$ represents the content of $SiO_2$ in terms of mol %, $[Al_2O_3]$ represents the content of $Al_2O_3$ in terms of mol %, $[B_2O_3]$ represents the content of $B_2O_3$ in terms of mol %, $[Li_2O]$ represents the content of $Li_2O$ in terms of mol %, $[Na_2O]$ represents the content of $Na_2O$ in terms of mol %, $[K_2O]$ represents the content of $K_2O$ in terms of mol %, $[MgO]$ represents the content of MgO in terms of mol %, $[CaO]$ represents the content of CaO in terms of mol %, $[BaO]$ represents the content of BaO in terms of mol %, $[TiO_2]$ represents the content of $TiO_2$ in terms of mol %, $[Y_2O_3]$ represents the content of $Y_2O_3$ in terms of mol %, $[ZrO_2]$ represents the content of $ZrO_2$ in terms of mol %, and $[P_2O_5]$ represents the content of $P_2O_5$ in terms of mol %.

$$X=61.1\times[SiO_2]+174.3\times[Al_2O_3]+11.3\times[B_2O_3]+124.7\times[Li_2O]-5.2\times[Na_2O]+226.7\times[K_2O]+139.4\times[MgO]+117.5\times[CaO]+89.6\times[BaO]+191.8\times[TiO_2]+226.7\times[Y_2O_3]+157.9\times[ZrO_2]-42.2\times[P_2O_5]$$

Figure 1:
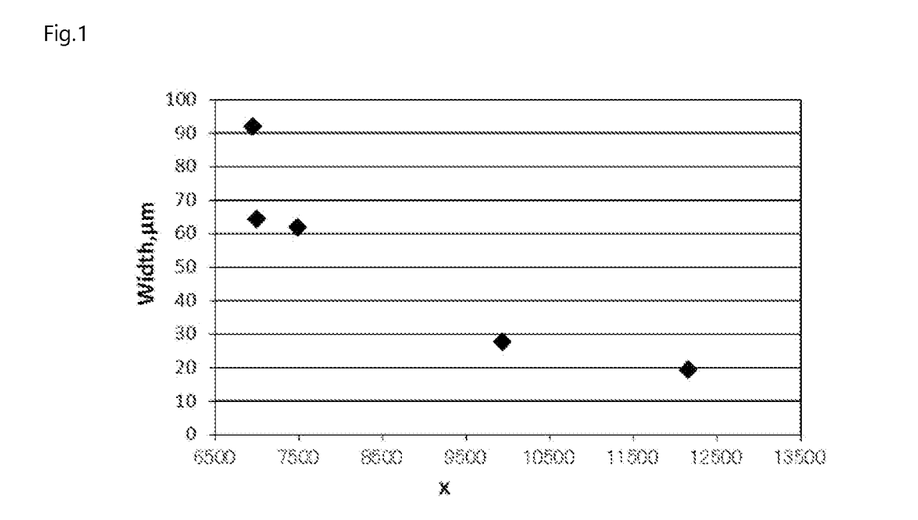
FIG. 1 is a graph for showing a relationship between an X value and a crack width (Width).
Figure 2:
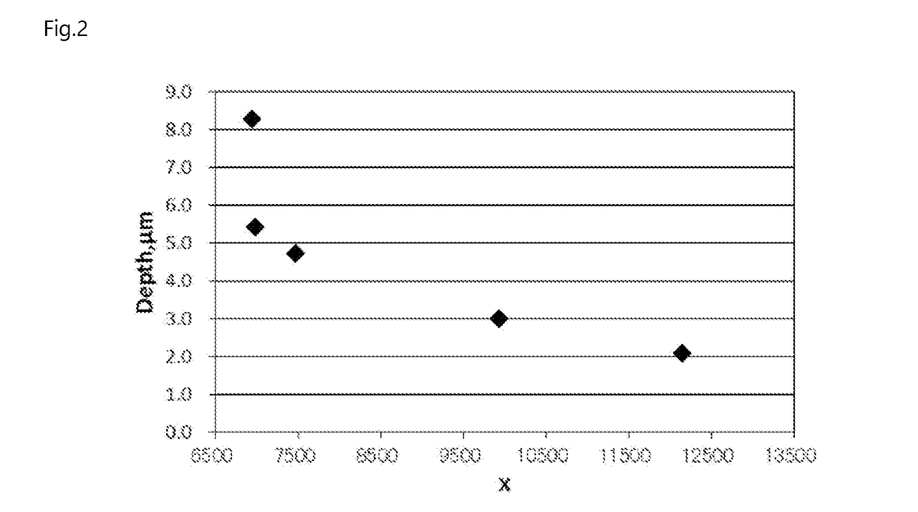
FIG. 2 is a graph for showing a relationship between an X value and a crack depth (Depth).

FIG. 1 is a graph for showing a relationship between the X value and a crack width (Width), and FIG. 2 is a graph for showing a relationship between the X value and a crack depth (Depth). As apparent from FIG. 1 and FIG. 2, it is found that, when the X value becomes larger, the width and depth of a scratch are remarkably reduced.

In addition, it is preferred that the cover glass according to the one embodiment of the present invention comprise as a glass composition, in terms of mol %, 20% to 80% of $SiO_2$, 5% to 30% of $Al_2O_3$, 0% to 20% of $B_2O_3$, 0% to 20% of $Li_2O$, 0% to 30% of $Na_2O$, 0% to 20% of $K_2O$, 0.1% to 40% of MgO, 0% to 20% of CaO, 0% to 20% of BaO, 0% to 20% of $TiO_2$, 0% to 20% of $Y_2O_3$, 0% to 20% of $ZrO_2$, and 0% to 20% of $P_2O_5$.

In addition, it is preferred that the cover glass according to the one embodiment of the present invention have a content of MgO of 10 mol % or more in the glass composition.

In addition, it is preferred that the cover glass according to the one embodiment of the present invention have a content of $P_2O_5$ of 1 mol % or more in the glass composition.

In addition, it is preferred that the cover glass according to the one embodiment of the present invention have a fracture toughness of 0.8 $MPa \cdot m^{0.5}$ or more. With this, the cover glass is less liable to suffer from a surface scratch.

Even when the cover glass suffers from a hard scratch, the width and depth of the scratch can be reduced. The "fracture toughness $K_{1c}$" as used herein is measured by a Single-Edge-Precracked-Beam method (SEPB method) based on "Testing methods for fracture toughness of fine ceramics at room temperature" of JIS R1607. The SEPB method is a method involving measuring, by a three-point bending fracture test of a precracked specimen, a maximum load when the specimen is fractured, and determining a plane-strain fracture toughness $K_{1c}$ based on the maximum load, the length of the crack, the dimensions of the specimen, and a distance between bending fulcrums. The value for the fracture toughness of each glass is determined as an average value of fine points.

In addition, it is preferred that the cover glass according to the one embodiment of the present invention have a crack resistance of 500 gf or more. The "crack resistance" as used herein refers to a load at which a crack occurrence rate is 50%. In addition, the "crack occurrence rate" as used herein refers to a value measured as described below. First, a Vickers indenter set to a predetermined load is pressed into a glass surface (optically polished surface) for 15 seconds in a constant-temperature and constant-humidity bath retained at a humidity of 30% and a temperature of 25° C., and after the 15 seconds, the number of cracks occurring from four corners of the indentation mark is counted (the number of cracks occurring from one indentation mark is supposed to be 4 at maximum). The indenter is pressed thereinto 50 times in this manner, and the total number of cracks occurring is determined. After that, the crack occurrence rate is determined by the expression of (total number of cracks occurring/200)×100(%).

In addition, it is preferred that the cover glass according to the one embodiment of the present invention have a thickness of from 0.1 mm to 2.0 mm.

In addition, it is preferred that the cover glass according to the one embodiment of the present invention comprise, in a surface thereof, a compressive stress layer obtained through ion exchange.

In addition, it is preferred that the cover glass according to the one embodiment of the present invention have a compressive stress value of 300 MPa or more and a depth of layer of 15 μm or more. The "compressive stress value" and the "depth of layer" as used herein refer to values calculated based on the number of interference fringes observed with a surface stress meter (e.g., FSM-6000 manufactured by Toshiba Corporation) and intervals therebetween. At the time of calculation, the refractive index and optical elastic constant of the glass are set to 1.50 and 29.4 [(nm/cm)/MPa], respectively.

In addition, it is preferred that the cover glass according to the one embodiment of the present invention be used for a touch panel display.

DESCRIPTION OF EMBODIMENTS

A cover glass of the present invention has an X value calculated by the above-mentioned equation 1 of 7,400 or more, preferably 8,000 or more, 8,250 or more, 8,500 or more, 9,000 or more, 9,500 or more, or 10,000 or more, particularly preferably from 11,000 to 20,000. When the X value is too small, the cover glass is liable to suffer from a surface scratch. In addition, the width and depth of the scratch are liable to be increased.

The cover glass of the present invention preferably has the following characteristics.

A crack resistance is preferably 500 kgf or more, 800 kgf or more, 1,000 kgf or more, or 1,500 kgf or more, particularly preferably 2,000 kgf or more. When the crack resistance is too low, the cover glass is liable to suffer from a surface scratch. In addition, the width and depth of the scratch are liable to be increased.

A fracture toughness $K_{1c}$ is preferably 0.8 MPa·m$^{0.5}$ or more, more preferably 0.9 MPa·m$^{0.5}$ or more, still more preferably 1.0 MPa·m$^{0.5}$ or more, particularly preferably from 1.1 MPa·m$^{0.5}$ to 3.5 MPa·m$^{0.5}$. In particular, a fracture toughness $K_{1c}$ under the state in which the cover glass is not subjected to ion exchange treatment is preferably 0.8 MPa·m$^{0.5}$ or more, more preferably 0.9 MPa·m$^{0.5}$ or more, still more preferably 1.0 MPa·m$^{0.5}$ or more, particularly preferably from 1.1 MPa·m$^{0.5}$ to 3.5 MPa·m$^{0.5}$. When the fracture toughness $K_{1c}$ is too small, the cover glass is liable to suffer from a surface scratch. In addition, the width and depth of the scratch are liable to be increased.

A Young's modulus is preferably 80 GPa or more, 85 GPa or more, 90 GPa or more, or 100 GPa or more, particularly preferably from 105 GPa to 150 GPa. When the Young's modulus is small, the cover glass is liable to be deflected in the case of having a small thickness.

A density is preferably 3.50 g/cm$^3$ or less, 3.25 g/cm$^3$ or less, 3.00 g/cm$^3$ or less, 2.60 g/cm$^3$ or less, 2.55 g/cm$^3$ or less, 2.50 g/cm$^3$ or less, or 2.49 g/cm$^3$ or less, particularly preferably from 2.40 g/cm$^3$ to 2.47 g/cm$^3$. As the density becomes lower, the weight of the cover glass can be reduced more. The density is easily reduced by increasing the content of $SiO_2$, $B_2O_3$, or $P_2O_5$ or reducing the content of an alkali metal oxide, an alkaline earth metal oxide, ZnO, $ZrO_2$, or $TiO_2$ in a glass composition.

A thermal expansion coefficient within the temperature range of from 30° C. to 380° C. is preferably 120×10$^{-7}$/° C. or less, 110×10$^{-7}$/° C. or less, or 100×10$^{-7}$/° C. or less, particularly preferably from 40×10$^{-7}$/° C. to 95×10$^{-7}$/° C. When the thermal expansion coefficient is too high, the cover glass is liable to be broken by a thermal shock. Thus, it becomes difficult to shorten a time required for preheating before ion exchange treatment or annealing after the ion exchange treatment can be shortened. The "thermal expansion coefficient within the temperature range of from 30° C. to 380° C." refers to a value for an average thermal expansion coefficient measured with a dilatometer.

A temperature at a viscosity at high temperature of 10$^{2.5}$ dPa·s is preferably 1,660° C. or less, less than 1,640° C., or 1,630° C. or less, particularly preferably from 1,400° C. to 1,620° C. When the temperature at a viscosity at high temperature of 10$^{2.5}$ dPa·s is too high, the meltability and the formability are reduced, with the result that it becomes difficult to form molten glass into a sheet shape.

A liquidus viscosity is preferably 10$^{2.0}$ dPa·s or more, 10$^{3.0}$ dPa·s or more, 10$^{4.0}$ dPa·s or more, 10$^{4.4}$ dPa·s or more, 10$^{4.8}$ dPa·s or more, 10$^{5.0}$ dPa·s or more, or 10$^{5.3}$ dPa·s or more, particularly preferably 10$^{5.5}$ dPa·s or more. As the liquidus viscosity becomes higher, devitrification resistance is improved more, and devitrified stones are less liable to be generated at the time of forming. The "liquidus viscosity" as used herein refers to a value for a viscosity at a liquidus temperature measured by a platinum sphere pull up method. The "liquidus temperature" refers to a temperature obtained as described below. Glass powder which has passed through a standard 30-mesh sieve (500 μm) and remained on a 50-mesh sieve (300 μm) is loaded into a platinum boat, and the platinum boat is kept for 24 hours in a temperature gradient furnace and is then taken out of the furnace. At this time, a highest temperature at which devitrification (devitrified stones) is observed with a microscope in glass is measured.

A spectral transmittance at a wavelength of 400 nm converted into a thickness of 0.8 mm is preferably 80% or more, 83% or more, 85% or more, or 87% or more, particularly preferably 90% or more. When the spectral transmittance at a wavelength of 400 nm converted into a thickness of 0.8 mm is too low, applications as a cover glass for a touch panel display become difficult.

The cover glass of the present invention preferably comprises as a glass composition, in terms of mol %, 20% to 80% of $SiO_2$, 5% to 30% of $Al_2O_3$, 0% to 20% of $B_2O_3$, 0% to 20% of $Li_2O$, 0% to 30% of $Na_2O$, 0% to 20% of $K_2O$, 0.1% to 40% of MgO, 0% to 20% of CaO, 0% to 20% of BaO, 0% to 20% of $TiO_2$, 0% to 20% of $Y_2O_3$, 0% to 20% of $ZrO_2$, and 0% to 20% of $P_2O_5$. Reasons why the content ranges of the components are restricted are described below. In the description of the content range of each component, the expression "%" means "mol %" unless otherwise specified.

$SiO_2$ is a component that forms a glass network, and the content of $SiO_2$ is preferably from 20% to 80%, from 30% to 70%, from 32% to 61%, from 33% to 55%, or from 34% to less than 50%, particularly preferably from 35% to 45%. When the content of $SiO_2$ is too small, vitrification does not occur easily, the thermal expansion coefficient becomes too high, and thermal shock resistance is liable to be reduced. Meanwhile, when the content of $SiO_2$ is too large, the meltability and the formability are liable to be reduced, and the thermal expansion coefficient becomes too low, with the result that it becomes difficult to match the thermal expansion coefficient with those of peripheral materials.

$Al_2O_3$ is a component that improves scratch resistance, and is also a component that improves ion exchange performance, a strain point, and a Young's modulus. When the content of $Al_2O_3$ is too small, the scratch resistance is liable to be reduced. In addition, there is a risk in that the ion exchange performance cannot be exhibited sufficiently. Therefore, the content of $Al_2O_3$ is preferably 5% or more, 8% or more, 10% or more, 12% or more, or 14% or more, particularly preferably 15% or more. Meanwhile, when the content of $Al_2O_3$ is too large, a viscosity at high temperature is increased, with the result that the meltability and the formability are liable to be reduced. In addition, a devitrified crystal is liable to be precipitated in the glass, and it becomes difficult to form the glass into a sheet shape by an overflow down-draw method or the like. Particularly when the glass is formed into a sheet shape by an overflow down-draw method involving using alumina-based refractory as forming body refractory, a devitrified crystal of spinel is liable to be precipitated at an interface with the alumina-based refractory. Further, acid resistance is reduced, with the result that it becomes difficult to subject the glass to an acid treatment step. Therefore, the content of $Al_2O_3$ is preferably 30% or less or 25% or less, particularly preferably 21% or less.

$B_2O_3$ is a component that reduces the viscosity at high temperature and a density, and stabilizes the glass to reduce a liquidus temperature. However, when the content of $B_2O_3$ is too large, the Young's modulus is liable to be reduced. Therefore, the content of $B_2O_3$ is preferably from 0% to 20%, from 0% to 15%, from 0.1% to 10%, or from 1% to 7%, particularly preferably from 2% to 5%.

$Li_2O$ is an ion exchange component. In addition, $Li_2O$ is a component that reduces the viscosity at high temperature to improve the meltability and the formability, and is also a component that improves the scratch resistance. Meanwhile, when the content of $Li_2O$ is too large, devitrification resistance is liable to be reduced. In addition, there is a risk in that $Li_2O$ is eluted into an ion exchange solution during ion exchange treatment and deteriorates the ion exchange solution. Therefore, the content of $Li_2O$ is preferably from 0% to 20%, from 0% to 7%, from 0% to 3%, from 0% to 1.5%, from 0% to less than 1%, from 0% to 0.5%, from 0% to 0.3%, or from 0% to less than 0.1%, particularly preferably from 0.01% to 0.05%. In addition, when priority is given to an improvement in scratch resistance while a reduction in devitrification resistance is permitted, the content of $Li_2O$ is preferably from 0% to 20%, from 1% to 18%, from 2% to 16%, from 3% to 14%, or from 4% to 12%, particularly preferably from 5% to 10%.

$Na_2O$ is an ion exchange component. In addition, $Na_2O$ is a component that increases the compressive stress value of a compressive stress layer, and is also a component that reduces the viscosity at high temperature to improve the meltability and the formability. In addition, $Na_2O$ is a component that improves the devitrification resistance, and is particularly a component that suppresses devitrification caused by a reaction with alumina-based refractory. When the content of $Na_2O$ is too large, the scratch resistance is liable to be reduced. Meanwhile, when the content of $Na_2O$ is too small, the viscosity at high temperature is increased, with the result that the meltability and the formability are reduced. In addition, the compressive stress value of the compressive stress layer is liable to be reduced. Therefore, the content of $Na_2O$ is preferably from 0% to 30%, from 0% to 20%, or from 1% to 17%, particularly preferably from 5% to 15%.

$K_2O$ is a component that reduces the viscosity at high temperature to improve the meltability and the formability, and improves the scratch resistance. However, among alkali metal oxides, $K_2O$ is a component that reduces the compressive stress value of the compressive stress layer to increase the depth of layer thereof. Therefore, from the viewpoint of increasing the compressive stress value, $K_2O$ is not advantageous. Therefore, the content of $K_2O$ is preferably from 0% to 20%, from 0% to 10%, or from 0% to 5%, particularly preferably from 0% to less than 1%.

MgO is a component that significantly improves the scratch resistance, and is also a component that improves the meltability and the formability. However, when the content of MgO is too large, the devitrification resistance is liable to be reduced. In particular, it becomes difficult to suppress devitrification caused by a reaction with alumina-based refractory. Therefore, the content of MgO is preferably from 0.1% to 50%, from 1% to 40%, from 5% to 35%, from 10% to 40%, from 15% to 45%, from 20% to 42%, or from 25% to 40%, particularly preferably from 30% to 35%.

The total content of $Al_2O_3$ and MgO is preferably from more than 20% to 55%, more preferably from 25% to 50%, from 30% to 45%, or from 32% to 42%, particularly preferably from 35% to 40%. When the total content of $Al_2O_3$ and MgO is too small, the scratch resistance is liable to be reduced.

CaO is a component that has a high effect of reducing the viscosity at high temperature to improve the meltability and the formability without reducing the devitrification resistance as compared to other components. However, when the content of CaO is too large, the ion exchange performance is reduced, or CaO is liable to deteriorate an ion exchange solution during ion exchange treatment. Therefore, the content of CaO is preferably from 0% to 20%, from 0% to 10%, from 0% to 5%, from 0% to 4%, from 0% to 3.5%, from 0% to 3%, from 0% to 2%, or from 0% to 1%, particularly preferably from 0% to 0.5%.

BaO is a component that reduces the viscosity at high temperature to improve the meltability and the formability, and is also a component that increases the strain point and the Young's modulus. However, when the content of BaO is too large, the scratch resistance is liable to be reduced. Besides, the density and the thermal expansion coefficient are liable to be increased, or the glass is liable to be devitrified. Therefore, a suitable content of BaO is from 0% to 20%, from 0% to 5%, from 0% to 2%, from 0% to 1.5%, from 0% to 1%, from 0% to 0.5%, or from 0% to 0.1%, particularly from 0% to less than 0.1%.

$TiO_2$ is a component that improves the ion exchange performance and the scratch resistance, and is also a component that reduces the viscosity at high temperature. However, when the content of $TiO_2$ is too large, transparency and the devitrification resistance are liable to be reduced. Therefore, the content of $TiO_2$ is preferably from 0% to 20%, from 0% to 10%, from 0% to 4.5%, from 0% to less than 1%, or from 0% to 0.5%, particularly preferably from 0% to 0.3%.

$Y_2O_3$ is a component that improves the scratch resistance. However, the cost of a raw material of $Y_2O_3$ is high in itself. In addition, when $Y_2O_3$ is added in a large amount, the devitrification resistance is liable to be reduced. Therefore, the content of $Y_2O_3$ is preferably from 0% to 20%, from 0% to 15%, from 0.1% to 12%, from 1% to 10%, or from 1.5% to 8%, particularly preferably from 2% to 6%.

$ZrO_2$ is a component that increases the Young's modulus, and is also a component that increases viscosity around the liquidus viscosity and the strain point. However, when the content of $ZrO_2$ is too large, there is a risk in that the devitrification resistance is remarkably reduced. Therefore, the content of $ZrO_2$ is from 0% to 20%, from 0% to 10%, or from 0% to 3%, preferably from 0% to 1%, particularly preferably from 0% to 0.1%.

$P_2O_5$ is a component that improves the ion exchange performance, and is particularly a component that increases the depth of layer. In addition, $P_2O_5$ has a tendency to improve crack resistance. However, when the content of $P_2O_5$ is too large, the glass undergoes phase separation, or water resistance is liable to be reduced. Therefore, the content of $P_2O_5$ is preferably from 0% to 20%, from 0% to 10%, from 0% to 3%, or from 0% to 1%, particularly preferably from 0% to 0.5%. When an emphasis is placed on an improvement in crack resistance, a suitable content of $P_2O_5$ is preferably from 0.1% to 18%, from 0.5% to 17%, or from 1% to 16%, particularly preferably from 2% to 15.5%.

For example, the following components other than the above-mentioned components may be added.

SrO is a component that reduces the viscosity at high temperature to improve the meltability and the formability, and is also a component that increases the strain point and the Young's modulus. However, when the content of SrO is too large, the scratch resistance is liable to be reduced. Besides, the density and the thermal expansion coefficient are liable to be increased, or the glass is liable to be devitrified. Therefore, a suitable content of SrO is from 0% to 2%, from 0% to 1.5%, from 0% to 1%, from 0% to 0.5%, or from 0% to 0.1%, particularly from 0% to less than 0.1%.

ZnO is a component that reduces the viscosity at high temperature without reducing the viscosity at low temperature. In addition, ZnO is a component that enhances the ion exchange performance, and is also a component that has a great effect of increasing the compressive stress value, in particular. However, when the content of ZnO is too large, there is a tendency that the glass undergoes phase separation, the devitrification resistance is reduced, the density is increased, and the depth of layer is reduced. Therefore, the content of ZnO is preferably from 0% to 3%, from 0% to 2%, or from 0% to 1%, particularly preferably from 0% to less than 1%.

$SnO_2$ is a component that improves the ion exchange performance. However, when the content of $SnO_2$ is too large, the devitrification resistance is liable to be reduced. Therefore, the content of $SnO_2$ is preferably from 0% to 3%, from 0.01% to 3%, from 0.05% to 3%, or from 0.1% to 3%, particularly preferably from 0.2% to 3%.

As a fining agent, one kind or two or more kinds selected from the group consisting of Cl, $SO_3$, and $CeO_2$ (preferably the group consisting of Cl and $SO_3$) may be added at from 0.001% to 1%.

A suitable content of $Fe_2O_3$ is less than 1,000 ppm (less than 0.1%), less than 800 ppm, less than 600 ppm, or less than 400 ppm, particularly from 30 ppm to less than 300 ppm. Further, a molar ratio $SnO_2/(Fe_2O_3+SnO_2)$ is controlled to preferably 0.8 or more or 0.9 or more, particularly preferably 0.95 or more, while the content of $Fe_2O_3$ is controlled in the above-mentioned range. With this, a visible light transmittance is easily improved.

$Gd_2O_3$, $Nb_2O_5$, $La_2O_3$, and $Ta_2O_5$ are each a component that improves the scratch resistance. However, the costs of raw materials of $Gd_2O_3$, $Nb_2O_5$, $La_2O_3$, and $Ta_2O_5$ are high in themselves. In addition, when $Gd_2O_3$, $Nb_2O_5$, $La_2O_3$, and $Ta_2O_5$ are added in large amounts, the devitrification resistance is liable to be reduced. Therefore, suitable contents of $Gd_2O_3$, $Nb_2O_5$, $La_2O_3$, and $Ta_2O_5$ are each 3% or less, 2% or less, 1% or less, or 0.5% or less, particularly 0.1% or less.

It is preferred that the cover glass of the present invention be substantially free of $As_2O_3$, $Sb_2O_3$, PbO, F, and the like as a glass composition from the standpoint of environmental considerations. In addition, it is also preferred that the cover glass be substantially free of $Bi_2O_3$ from the standpoint of environmental considerations. The "substantially free of" has a concept in which the explicit component is not positively added as a glass component, but its addition at an impurity level is permitted, and specifically refers to the case in which the content of the explicit component is less than 0.05%.

The cover glass of the present invention has a thickness of preferably 2.0 mm or less, 1.5 mm or less, 1.3 mm or less, 1.1 mm or less, or 1.0 mm or less, particularly preferably 0.9 mm or less. As the thickness becomes smaller, the weight of the cover glass can be reduced more. Meanwhile, when the thickness is too small, it becomes difficult to obtain desired mechanical strength. Therefore, the thickness is preferably 0.1 mm or more, 0.3 mm or more, 0.4 mm or more, 0.5 mm or more, or 0.6 mm or more, particularly preferably 0.7 mm or more.

A method of manufacturing the cover glass of the present invention is, for example, as described below. As a preferred method, first, glass raw materials blended so as to give a desired glass composition are loaded into a continuous melting furnace, heated to be melted at 1,550° C. to 1,700° C., and fined. After that, the molten glass is supplied to a forming apparatus and formed into a sheet shape, followed by cooling. As a method of cut processing, into predetermined dimensions, the glass having been formed into a sheet shape, a well-known method may be adopted.

As a method of forming the molten glass into a sheet shape, an overflow down-draw method is preferably adopted. The overflow down-draw method is a method by which a high-quality cover glass can be manufactured in a large amount. The "overflow down-draw method" as used herein refers to a method involving causing molten glass to overflow from both sides of forming body refractory, and subjecting the overflowing molten glasses to down-draw downward while the molten glasses are joined at the lower end of the forming body refractory, to thereby form a sheet shape. In the overflow down-draw method, a surface to serve as the surface of the cover glass is not brought into contact with the forming body refractory, and is formed into a sheet shape in a state of a free surface. Thus, a cover glass having satisfactory surface quality can be manufactured inexpensively without polishing.

Various forming methods other than the overflow down-draw method may also be adopted. For example, forming methods such as a float method, a down-draw method (such as a slot down-draw method or a re-draw method), a roll out method, and a press method may be adopted.

The cover glass of the present invention may or may not be subjected to ion exchange treatment, but when the cover glass is subjected to the ion exchange treatment, the compressive stress layer is formed in the surface, and hence the scratch resistance can be further improved. The conditions of the ion exchange treatment are not particularly limited, and optimum conditions may be selected in consideration of the viscosity characteristics of the glass, a thickness, an internal tensile stress, a dimensional change, and the like. Particularly when a K ion in a $KNO_3$ molten salt is ion exchanged with a Na component in the glass, the compressive stress layer can be formed efficiently. At the time of ion exchange treatment, the temperature of an ion exchange solution is preferably from 400° C. to 450° C., and an ion exchange time is preferably from 2 hours to 6 hours. With this, the compressive stress layer can be efficiently formed in the surface.

The cover glass of the present invention preferably comprises, in the surface thereof, the compressive stress layer obtained through ion exchange. The compressive stress layer has a compressive stress value of preferably 300 MPa or more, 400 MPa or more, 500 MPa or more, or 600 MPa or more, particularly preferably 700 MPa or more. As the compressive stress value becomes higher, the fracture toughness $K_{1c}$ is increased more. Meanwhile, when an excessively large compressive stress is formed in the surface, an internal tensile stress is excessively increased. In addition, there is a risk in that dimensional changes before and after the ion exchange treatment are increased. Therefore, the compressive stress layer has a compressive stress value of preferably 1,800 MPa or less or 1,650 MPa or less, particularly preferably 1,500 MPa or less. There is a tendency that the compressive stress value is increased when the ion exchange time is shortened or the temperature of the ion exchange solution is reduced.

The compressive stress layer has a depth of layer of preferably 15 μm or more, 20 μm or more, 25 μm or more, or 30 μm or more, particularly preferably 35 μm or more. As the depth of layer becomes larger, variation in mechanical strength becomes smaller. Meanwhile, as the depth of layer becomes larger, the internal tensile stress is increased more. In addition, there is a risk in that the dimensional changes before and after the ion exchange treatment are increased. Further, when the depth of layer is excessively large, there is a tendency that the compressive stress value is reduced. Therefore, the depth of layer is preferably 60 μm or less or 50 μm or less, particularly preferably 45 μm or less. There is a tendency that the depth of layer is increased when the ion exchange time is prolonged or the temperature of the ion exchange solution is increased.

An internal tensile stress value is preferably 150 MPa or less, 120 Mpa or less, 100 MPa or less, 80 MPa or less, or 70 MPa or less, particularly preferably 60 MPa or less. When the internal tensile stress value is too high, the cover glass is liable to undergo self-destruction owing to a hard scratch. Meanwhile, when the internal tensile stress value is too low, it becomes difficult to ensure the mechanical strength of the cover glass. The internal tensile stress value is preferably 15 MPa or more, 25 MPa or more, or 35 MPa or more, particularly preferably 40 MPa or more. The internal tensile stress may be calculated by the following equation 2.

Internal tensile stress value=(compressive stress value×depth of layer)/(thickness−2×depth of layer)

EXAMPLES

The present invention is hereinafter described with reference to Examples. The following Examples are merely illustrative. The present invention is by no means limited to the following Examples.

Examples (Sample Nos. 1 to 42) of the present invention are shown in Tables 1 to 4, and Comparative Examples (Sample Nos. 43 to 45) of the present invention are shown in Table 4. The "N.A." in the tables means that the component is not measured.

TABLE 1

| (mol %) | No. 1 | No. 2 | No. 3 | No. 4 | No. 5 | No. 6 | No. 7 |
|---|---|---|---|---|---|---|---|
| $SiO_2$ | 38.0 | 38.0 | 38.0 | 38.0 | 60.0 | 54.0 | 54.0 |
| $Al_2O_3$ | 16.0 | 12.5 | 12.5 | 12.5 | 20.0 | 25.0 | 20.0 |
| $B_2O_3$ | 0.0 | 3.5 | 7.0 | 9.0 | 0.0 | 1.0 | 1.0 |
| $Li_2O$ | 0.0 | 0.0 | 0.0 | 0.0 | 0.0 | 0.0 | 0.0 |
| $Na_2O$ | 6.0 | 6.0 | 6.0 | 6.0 | 0.0 | 0.0 | 0.0 |
| $K_2O$ | 0.0 | 0.0 | 0.0 | 0.0 | 0.0 | 0.0 | 0.0 |
| MgO | 34.5 | 34.5 | 34.5 | 34.5 | 20.0 | 20.0 | 25.0 |
| CaO | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 |
| $TiO_2$ | 3.5 | 3.5 | 0.0 | 0.0 | 0.0 | 0.0 | 0.0 |
| $ZrO_2$ | 0.0 | 0.0 | 0.0 | 0.0 | 0.0 | 0.0 | 0.0 |
| $Y_2O_3$ | 2.0 | 2.0 | 2.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.0 | 0.0 | 0.0 | 0.0 | 0.0 | 0.0 | 0.0 |
| $Fe_2O_3$ (ppm) | N.A. | N.A. | N.A. | N.A. | N.A. | N.A. | N.A. |
| X | 11,013 | 10,443 | 9,811 | 9,380 | 9,940 | 10,456 | 10,282 |

TABLE 1-continued

| | | | | | | | |
|---|---|---|---|---|---|---|---|
| E (GPa) | 106 | 103 | 98 | 94 | 102 | 105 | 104 |
| $K_{1C}$ (MPa·m$^{0.5}$) | 1.0 | 1.0 | 0.9 | 0.9 | 1.0 | 1.0 | 1.0 |
| Crack resistance (gf) | N.A. | N.A. | N.A. | N.A. | 1,500 | 2,000 | 1,300 |

| (mol %) | No. 8 | No. 9 | No. 10 | No. 11 | No. 12 | No. 13 | No. 14 |
|---|---|---|---|---|---|---|---|
| $SiO_2$ | 51.0 | 51.0 | 51.0 | 50.5 | 38.0 | 38.0 | 41.5 |
| $Al_2O_3$ | 23.0 | 21.0 | 19.0 | 22.9 | 12.5 | 12.5 | 12.5 |
| $B_2O_3$ | 6.0 | 4.0 | 0.0 | 3.7 | 0.0 | 0.0 | 0.0 |
| $Li_2O$ | 2.0 | 2.0 | 2.0 | 1.8 | 0.0 | 0.0 | 0.0 |
| $Na_2O$ | 0.0 | 1.0 | 5.0 | 2.8 | 0.0 | 6.0 | 6.0 |
| $K_2O$ | 0.0 | 0.0 | 0.0 | 0.0 | 0.0 | 0.0 | 0.0 |
| MgO | 18.0 | 21.0 | 23.0 | 18.3 | 34.5 | 34.5 | 34.5 |
| CaO | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 |
| $TiO_2$ | 0.0 | 0.0 | 0.0 | 0.0 | 10.0 | 7.0 | 3.5 |
| $ZrO_2$ | 0.0 | 0.0 | 0.0 | 0.0 | 3.0 | 0.0 | 0.0 |
| $Y_2O_3$ | 0.0 | 0.0 | 0.0 | 0.0 | 2.0 | 2.0 | 2.0 |
| $P_2O_5$ | 0.0 | 0.0 | 0.0 | 0.0 | 0.0 | 0.0 | 0.0 |
| $SnO_2$ | 0.0 | 0.0 | 0.0 | 0.0 | 0.0 | 0.0 | 0.0 |
| $Fe_2O_3$ (ppm) | N.A. | N.A. | N.A. | N.A. | N.A. | N.A. | N.A. |
| X | 9,951 | 9,993 | 9,857 | 9,880 | 12,155 | 11,075 | 10,617 |
| E (GPa) | 101 | 100 | 100 | 100 | 122 | 115 | 104 |
| $K_{1C}$ (MPa·m$^{0.5}$) | 0.9 | 1.0 | 0.9 | 0.9 | 1.1 | 1.0 | 1.0 |
| Crack resistance (gf) | 3,000 | 1,800 | 500 | 1,300 | N.A. | N.A. | N.A. |

TABLE 2

| (mol %) | No. 15 | No. 16 | No. 17 | No. 18 | No. 19 | No. 20 | No. 21 |
|---|---|---|---|---|---|---|---|
| $SiO_2$ | 45.0 | 47.0 | 38.0 | 38.0 | 50.7 | 43.2 | 35.7 |
| $Al_2O_3$ | 12.5 | 12.5 | 12.5 | 12.5 | 13.4 | 13.4 | 13.4 |
| $B_2O_3$ | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 |
| $Na_2O$ | 6.0 | 6.0 | 6.0 | 6.0 | 16.4 | 16.4 | 16.4 |
| $K_2O$ | 0.0 | 0.0 | 0.0 | 0.0 | 0.0 | 0.0 | 0.0 |
| MgO | 34.5 | 34.5 | 34.5 | 34.5 | 17.5 | 25.0 | 32.5 |
| CaO | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 |
| $TiO_2$ | 0.0 | 0.0 | 3.5 | 0.0 | 0.0 | 0.0 | 0.0 |
| $ZrO_2$ | 0.0 | 0.0 | 0.0 | 0.0 | 0.0 | 0.0 | 0.0 |
| $Y_2O_3$ | 2.0 | 0.0 | 5.5 | 9.0 | 2.0 | 2.0 | 2.0 |
| $P_2O_5$ | 0.0 | 0.0 | 0.0 | 0.0 | 0.0 | 0.0 | 0.0 |
| $SnO_2$ | 0.0 | 0.0 | 0.0 | 0.0 | 0.0 | 0.0 | 0.0 |
| $Fe_2O_3$ (ppm) | N.A. | N.A. | N.A. | N.A. | N.A. | N.A. | N.A. |
| X | 10,160 | 9,829 | 11,197 | 11,319 | 8,239 | 8,826 | 9,414 |
| E (GPa) | 101 | 97 | 110 | 113 | 83 | 91 | 93 |
| $K_{1C}$ (MPa·m$^{0.5}$) | 1.0 | 0.9 | 1.0 | 1.1 | 0.8 | 0.9 | 0.9 |
| Crack resistance (gf) | N.A. | N.A. | N.A. | N.A. | N.A. | N.A. | N.A. |

| (mol %) | No. 22 | No. 23 | No. 24 | No. 25 | No. 26 | No. 27 | No. 28 |
|---|---|---|---|---|---|---|---|
| $SiO_2$ | 47.2 | 39.7 | 32.2 | 54.2 | 46.7 | 39.2 | 58.2 |
| $Al_2O_3$ | 13.4 | 13.4 | 13.4 | 13.4 | 13.4 | 13.4 | 13.4 |
| $B_2O_3$ | 3.5 | 3.5 | 3.5 | 0.0 | 0.0 | 0.0 | 0.0 |
| $Li_2O$ | 0.0 | 0.0 | 0.0 | 0.0 | 0.0 | 0.0 | 0.0 |
| $Na_2O$ | 16.4 | 16.4 | 16.4 | 12.9 | 12.9 | 12.9 | 12.9 |
| $K_2O$ | 0.0 | 0.0 | 0.0 | 0.0 | 0.0 | 0.0 | 0.0 |
| MgO | 17.5 | 25.0 | 32.5 | 17.5 | 25.0 | 32.5 | 10.0 |
| CaO | 0.0 | 0.0 | 0.0 | 0.0 | 0.0 | 0.0 | 3.5 |
| BaO | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 |
| $ZrO_2$ | 0.0 | 0.0 | 0.0 | 0.0 | 0.0 | 0.0 | 0.0 |
| $Y_2O_3$ | 2.0 | 2.0 | 2.0 | 2.0 | 2.0 | 2.0 | 2.0 |
| $P_2O_5$ | 0.0 | 0.0 | 0.0 | 0.0 | 0.0 | 0.0 | 0.0 |
| $SnO_2$ | 0.0 | 0.0 | 0.0 | 0.0 | 0.0 | 0.0 | 0.0 |
| $Fe_2O_3$ (ppm) | N.A. | N.A. | N.A. | N.A. | N.A. | N.A. | N.A. |
| X | 8,065 | 8,652 | 9,239 | 8,472 | 9,059 | 9,646 | 8,082 |

TABLE 2-continued

| | | | | | | | |
|---|---|---|---|---|---|---|---|
| E (GPa) | 80 | 85 | 92 | 83 | 89 | 96 | 82 |
| $K_{1C}$ (MPa·m$^{0.5}$) | 0.8 | 0.8 | 0.9 | 0.8 | 0.9 | 0.9 | 0.8 |
| Crack resistance (gf) | N.A. | N.A. | N.A. | N.A. | N.A. | N.A. | N.A. |

TABLE 3

| (mol %) | No. 29 | No. 30 | No. 31 | No. 32 | No. 33 | No. 34 | No. 35 | No. 36 | No. 37 | No. 38 | No. 39 |
|---|---|---|---|---|---|---|---|---|---|---|---|
| $SiO_2$ | 50.7 | 43.2 | 35.7 | 58.2 | 50.7 | 43.2 | 35.7 | 57.7 | 50.2 | 42.7 | 71.6 |
| $Al_2O_3$ | 13.4 | 13.4 | 13.4 | 13.4 | 13.4 | 13.4 | 13.4 | 9.9 | 9.9 | 9.9 | 14.3 |
| $B_2O_3$ | 0.0 | 0.0 | 0.0 | 0.0 | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 | 0.0 | 0.0 | 0.0 | 8.1 |
| $Na_2O$ | 12.9 | 12.9 | 12.9 | 12.9 | 12.9 | 12.9 | 12.9 | 12.9 | 12.9 | 12.9 | 0.5 |
| $K_2O$ | 0.0 | 0.0 | 0.0 | 0.0 | 0.0 | 0.0 | 0.0 | 0.0 | 0.0 | 0.0 | 0.2 |
| MgO | 17.5 | 25.0 | 32.5 | 10.0 | 17.5 | 25.0 | 32.5 | 17.5 | 25.0 | 32.5 | 1.1 |
| CaO | 3.5 | 3.5 | 3.5 | 0.0 | 0.0 | 0.0 | 0.0 | 0.0 | 0.0 | 0.0 | 0.0 |
| BaO | 0.0 | 0.0 | 0.0 | 3.5 | 3.5 | 3.5 | 3.5 | 0.0 | 0.0 | 0.0 | 0.5 |
| $TiO_2$ | 0.0 | 0.0 | 0.0 | 0.0 | 0.0 | 0.0 | 0.0 | 0.0 | 0.0 | 0.0 | 1.7 |
| $ZrO_2$ | 0.0 | 0.0 | 0.0 | 0.0 | 0.0 | 0.0 | 0.0 | 0.0 | 0.0 | 0.0 | 1.2 |
| $Y_2O_3$ | 2.0 | 2.0 | 2.0 | 2.0 | 2.0 | 2.0 | 2.0 | 2.0 | 2.0 | 2.0 | 0.0 |
| $P_2O_5$ | 0.0 | 0.0 | 0.0 | 0.0 | 0.0 | 0.0 | 0.0 | 0.0 | 0.0 | 0.0 | 0.7 |
| $SnO_2$ | 0.0 | 0.0 | 0.0 | 0.0 | 0.0 | 0.0 | 0.0 | 0.0 | 0.0 | 0.0 | 0.1 |
| $Fe_2O_3$ (ppm) | N.A. | N.A. | N.A. | N.A. | N.A. | N.A. | N.A. | N.A. | N.A. | N.A. | N.A. |
| X | 8,669 | 9,256 | 9,844 | 7,984 | 8,571 | 9,159 | 9,746 | 8,076 | 8,663 | 9,250 | 8,612 |
| E (GPa) | 88 | 94 | 98 | 81 | 86 | 92 | 96 | 82 | 89 | 95 | 86 |
| $K_{1C}$ (MPa·m$^{0.5}$) | 0.8 | 0.9 | 0.9 | 0.8 | 0.8 | 0.9 | 0.9 | 0.8 | 0.8 | 0.9 | 0.8 |
| Crack resistance (gf) | N.A. | N.A. | N.A. | N.A. | N.A. | N.A. | N.A. | N.A. | N.A. | N.A. | 1,390 |

TABLE 4

| (mol %) | No. 40 | No. 41 | No. 42 | No. 43 | No. 44 | No. 45 |
|---|---|---|---|---|---|---|
| $SiO_2$ | 39.0 | 53.0 | 63.6 | 65.4 | 66.4 | 46.2 |
| $Al_2O_3$ | 33.0 | 31.0 | 16.6 | 15.4 | 11.4 | 19.4 |
| $B_2O_3$ | 0.0 | 0.0 | 0.0 | 0.0 | 0.5 | 0.0 |
| $Li_2O$ | 1.0 | 1.0 | 8.2 | 0.0 | 0.0 | 0.0 |
| $Na_2O$ | 0.0 | 0.0 | 8.1 | 16.4 | 15.3 | 23.4 |
| $K_2O$ | 0.0 | 0.0 | 0.5 | 0.0 | 1.4 | 6.3 |
| MgO | 13.0 | 12.0 | 0.3 | 2.6 | 4.7 | 0.0 |
| CaO | 0.0 | 0.0 | 0.0 | 0.0 | 0.1 | 0.0 |
| BaO | 0.0 | 0.0 | 0.0 | 0.0 | 0.0 | 0.0 |
| $TiO_2$ | 0.0 | 0.0 | 0.0 | 0.0 | 0.0 | 0.0 |
| $ZrO_2$ | 0.0 | 0.0 | 0.0 | 0.0 | 0.0 | 0.0 |
| $Y_2O_3$ | 0.0 | 0.0 | 0.0 | 0.0 | 0.0 | 0.0 |
| $P_2O_5$ | 14.0 | 3.0 | 2.7 | 0.0 | 0.0 | 4.7 |
| $SnO_2$ | 0.0 | 0.0 | 0.0 | 0.2 | 0.2 | 0.0 |
| $Fe_2O_3$ (ppm) | 60 | 60 | 480 | 60 | 60 | N.A. |
| X | 9,481 | 10,313 | 7,799 | 6,952 | 6,955 | 7,312 |
| E (GPa) | 96 | 99 | 77 | 70 | 70 | 75 |
| $K_{1C}$ (MPa·m$^{0.5}$) | 0.9 | 1.0 | N.A. | 0.7 | 0.7 | 0.7 |
| Crack resistance (gf) | 2,900 | 2,800 | 1,100 | 1,200 | 1,100 | N.A. |

Samples in the tables were each produced as described below. First, glass raw materials were blended so as to give a glass composition shown in the table, and were melted at 1,550° C. for 21 hours in a platinum pot. Subsequently, the obtained molten glass was poured out on a carbon sheet and formed into a flat sheet shape, followed by being annealed in an annealing furnace. The surface of the obtained sheet-shaped glass was optically polished so as to give a thickness of 0.8 mm, and the sheet-shaped glass was evaluated for various characteristics.

The Young's modulus E is a value measured by a well-known resonance method.

The fracture toughness $K_{1c}$ is measured by a SEPB method based on "Testing methods for fracture toughness of fine ceramics at room temperature" of JIS R1607. The value for the fracture toughness of each sample is determined as an average value of fine points.

The crack resistance (a load at which a crack occurrence rate is 50%) is a value calculated as described below. A Vickers indenter set to a predetermined load is pressed into a glass surface (optically polished surface) for 15 seconds, and after the 15 seconds, the number of cracks occurring from four corners of the indentation mark is counted (the number of cracks occurring from one indentation mark is supposed to be 4 at maximum).

As apparent from the tables, Sample Nos. 1 to 42 are each considered to have high scratch resistance because of having a large X value. Meanwhile, Sample Nos. 43 to 45 are each considered to have low scratch resistance because of having a small X value.

The invention claimed is:

1. A cover glass, which comprises in a glass composition at least three or more components selected from $SiO_2$, $Al_2O_3$, $B_2O_3$, $Li_2O$, $Na_2O$, $K_2O$, MgO, CaO, BaO, $TiO_2$, $Y_2O_3$, $ZrO_2$, and $P_2O_5$, wherein the glass composition comprises 12 mol % to 30 mol % of $Al_2O_3$, 1 mol % to 15 mol % of $Na_2O$ and 0 mol % to 1 mol % of CaO, and which has an X value of 7,400 or more calculated by the following equation $$X=61.1\times[SiO_2]+174.3\times[Al_2O_3]+1\times[B_2O_3]+124.7\times[Li_2O]-5.2\times[Na_2O]+226.7\times[K_2O]+139.4\times[MgO]+117.5\times[CaO]+89.6\times[BaO]+191.8\times[TiO_2]+226.7\times[Y_2O_3]+157.9\times[ZrO_2]-42.2\times[P_2O_5].$$

2. The cover glass according to claim 1, wherein the cover glass comprises as a glass composition, in terms of mol %, 20% to 80% of $SiO_2$, 12% to 30% of $Al_2O_3$, 0% to 20% of $B_2O_3$, 0% to 20% of $Li_2O$, 1% to 15% of $Na_2O$, 0% to 20% of $K_2O$, 0.1% to 40% of MgO, 0% to 1% of CaO, 0% to 20% of BaO, 0% to 20% of $TiO_2$, 0% to 20% of $Y_2O_3$, 0% to 20% of $ZrO_2$, and 0% to 20% of $P_2O_5$.

3. The cover glass according to claim 1, wherein the cover glass has a content of MgO of more than 10 mol % in the glass composition.

4. The cover glass according to claim 1, wherein the cover glass has a content of $P_2O_5$ of 1 mol % or more in the glass composition.

5. The cover glass according to claim 1, wherein the cover glass has a fracture toughness of 0.8 $MPa \cdot m^{0.5}$ or more.

6. The cover glass according to claim 1, wherein the cover glass has a crack resistance of 500 gf or more.

7. The cover glass according to claim 1, wherein the cover glass has a thickness of from 0.1 mm to 2.0 mm.

8. The cover glass according to claim 1, wherein the cover glass comprises, in a surface thereof, a compressive stress layer obtained through ion exchange.

9. The cover glass according to claim 8, wherein the compressive stress layer has a compressive stress value of 300 MPa or more and a depth of layer of 15 μm or more.

10. The cover glass according to claim 1, wherein the cover glass is used for a touch panel display.

11. The cover glass according to claim 2, wherein the cover glass has a content of MgO of more than 10 mol % in the glass composition.

12. The cover glass according to claim 1, wherein the X values is 8000 or more.

13. The cover glass according to claim 1, wherein the X values is 8500 or more.

14. The cover glass according to claim 1, wherein the X values is 9000 or more.

15. The cover glass according to claim 2, wherein the X values is 8000 or more.

16. The cover glass according to claim 2, wherein the X values is 8500 or more.

17. The cover glass according to claim 2, wherein the X values is 9000 or more.

* * * * *